H. K. MOORE & R. B. WOLF.
PROCESS OF MAKING SULFITE FIBER AND RECLAIMING SULFUR DIOXID.
APPLICATION FILED FEB. 1, 1910.
1,119,977.
Patented Dec. 8, 1914.
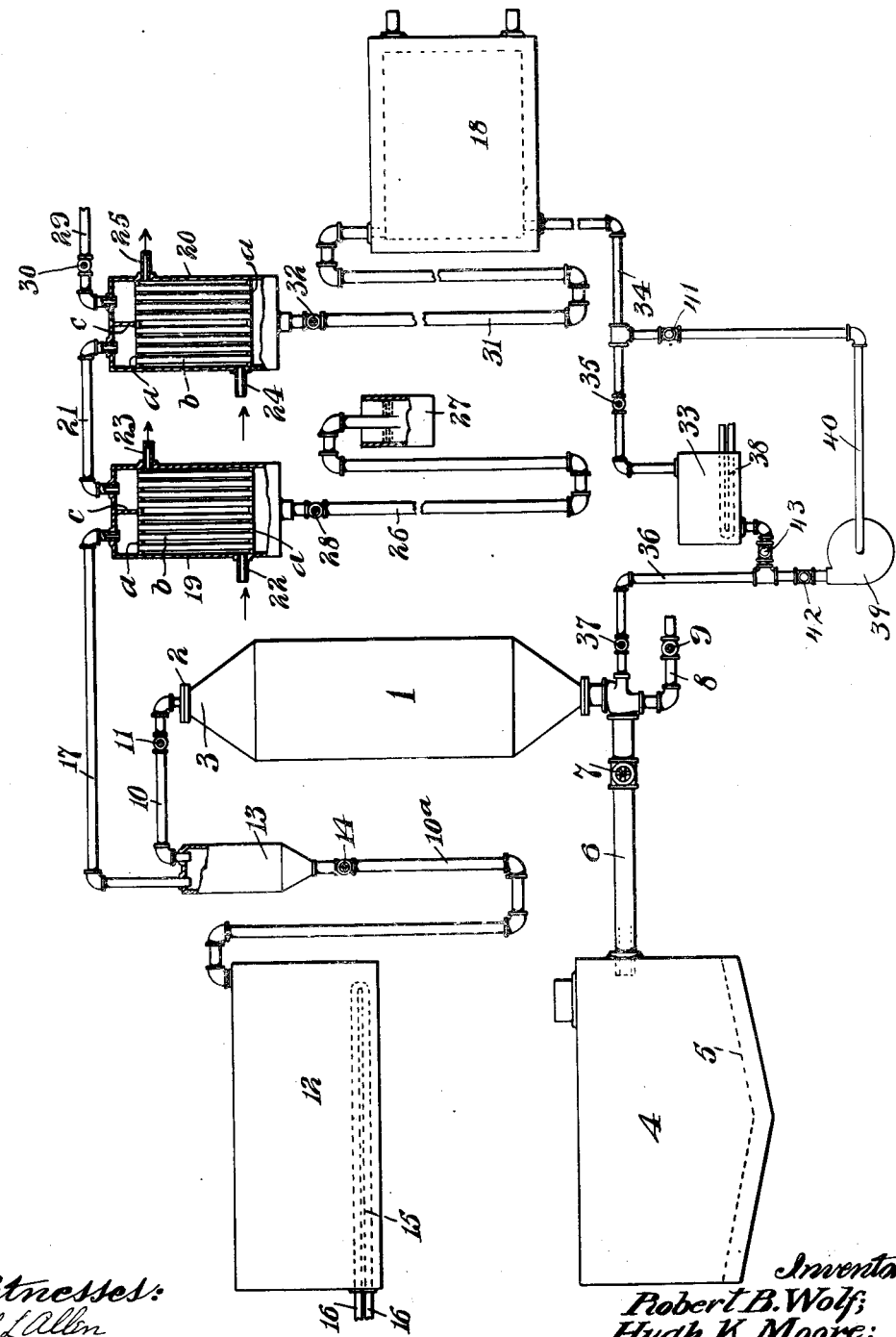

UNITED STATES PATENT OFFICE.

HUGH K. MOORE AND ROBERT B. WOLF, OF BERLIN, NEW HAMPSHIRE.

PROCESS OF MAKING SULFITE FIBER AND RECLAIMING SULFUR DIOXID.

1,119,977.   Specification of Letters Patent.   Patented Dec. 8, 1914.

Application filed February 1, 1910. Serial No. 541,246.

*To all whom it may concern:*

Be it known that we, HUGH K. MOORE and ROBERT B. WOLF, both of Berlin, in the county of Coos and State of New Hampshire, have invented certain new and useful Improvements in Processes of Making Sulfite Fiber and Reclaiming Sulfur Dioxid, of which the following is a specification.

This invention has relation to the manufacture of sulfite fiber and has for its object to produce a greater quantity of fiber from the raw material than heretofore possible, to prevent the weakening and discoloration of the cellulose, to produce a cleaner pulp and one which contains a lower lignin content, to effect a saving in the cost of making sulfite pulp, and otherwise to prevent waste and to increase the efficiency of the process.

Heretofore in the manufacture of sulfite fiber, it has been customary to place the chips and the acid in a digester of well known construction and close the neck thereof, after which steam is injected into the bottom of the digester to bring the contents thereof to the proper temperature. When the pressure in the digester has reached the point at which it is desired to cook the raw material, no more steam can be admitted and consequently no increase in the temperature of the mixture in the digester can be obtained, unless some of the gases or liquor or both are allowed to escape through a relief pipe extending from the top of the digester. According to present methods, the gases are reclaimed by conducting them to a storage tank containing the acid to be used for filling the digesters. In practising the method thus briefly described, it has been apparent to us that there are several evils which affect the product and the economy of operation. To explain these, it may be pointed out that the acid heretofore employed for cooking the raw materials in the digester consists of a base such as calcium, magnesium (or in some cases codium) and water subjected to a reaction with sulfur dioxid ($SO_2$). For instance, in the event that calcium be employed as the base to form calcium bisulfite, the latter may be produced either by the milk-of-lime system or by the tower system. In the former, the lime is suspended in water and sulfur dioxid gas is forced or sucked through it, converting the lime into calcium bisulfite, which in the case of a pure calcium base would be $CaS_2O_5$, the water absorbing a certain portion of the sulfur dioxid gas and forming sulfurous acid, $H_2SO_3$, so that the resulting acid consists of a mixture of sulfurous acid, bisulfite of calcium and water. In the latter, *i. e.* the tower system, the water is passed over calcium carbonate (in the form of lime rock) and sulfur dioxid is brought into contact with them, so that the calcium base is dissolved to form first monosulfite of calcium and subsequently bisulfite, and the water takes up a certain portion of the sulfur dioxid and forms sulfurous acid, so that the resultant acid is substantially the same as that produced by the milk-of-lime system. In either case, the acid liquid is weak in free or uncombined sulfurous acid or sulfur dioxid. According to modern methods, steam must be injected into the digester from time to time so that the contents, consisting of the raw material and the acid such as described, may be kept in circulation and the temperature maintained at a point to permit the desired reactions. The effect of the addition of steam, however, is to weaken the acid and to render it necessary to maintain a consequently higher temperature to secure the desired reactions than would be necessary were the acid of original strength. On the other hand, however, even were it possible heretofore to increase the acid strength of the solution, such increase would render it difficult to fill the digesters in the first instance, for the heat of the digesters (resulting from the previous cooking operation) would cause the giving off of sulfur dioxid gas in such quantities as to be extremely dangerous for the operators or workmen in proximity to the digesters and those whose duty it is to place the covers on the digesters after the charging is completed.

In accordance with our invention, we are able to secure in the digesters an acid liquor of the desired strength and to maintain it at full strength. The digester in the first instance is charged with raw material and with water, or a solution having a base (*e. g.* calcium) with which sulfur dioxid may be combined, or the usual calcium bisulfite, and the cover is secured in place. Substantially sulfur dioxid is injected into the digester to bring the liquor therein to its desired acid strength. This addition of the sulfur dioxid, when water, or milk of lime, is the initially introduced liquor, causes the formation of sulfurous acid in the one case, or calcium bisulfite and sulfurous acid in the second case, the reactions occurring in the closed digester itself. In the event that the digester be charged with the usual calcium bisulfite, the injection of the sulfur dioxid brings it to the desired full strength, and compensates for the weakening of the acid liquor by the moisture in the raw material, by the condensation of the steam used in the cooking process, and by the combination of the sulfurous acid with the lignin contents of the raw material. While we prefer and recommend that sulfur dioxid be injected either in liquid or gaseous form, yet it will be appreciated that it would not constitute a departure from the invention were the sulfur dioxid, before injection, dissolved or combined in a suitable liquor.

We also provide a continuous process in which the sulfur dioxid gas, which escapes from the relief pipe when the steam is injected into the digester, is reclaimed, converted into liquid form, and again injected into the digester as required. In the reclamation of the sulfur dioxid, it is subjected to cooling or refrigeration to reduce it to liquid form, and it is preferably injected into the digester by heating it until its pressure is sufficient.

On the drawing, we have illustrated diagrammatically and conventionally forms of apparatus which may be employed in carrying out our process.

On the said drawing, the digester is indicated at 1 and is of the usual type having an acid-proof lining. The digester is filled with chips or raw material and either with the usual liquor consisting of a mixture of sulfurous acid, bisulfite of calcium and water, or else with a liquor consisting of water or else containing a suitable base which may be formed into bisulfite by the addition of sulfur dioxid ($SO_2$), such, for instance, as milk of lime. This charge of liquor is introduced into the digester by removing the cover 2 which closes the neck 3.

4 indicates the usual blow pit which has a false bottom 5 through which the waste liquors are allowed to drain, and the bottom of the digester is connected with the blow pit by the usual blow pipe 6 having the valve 7.

The steam is injected into the digester through a pipe 8 leading from a suitable steam generator and having the usual valve 9. Leading from the neck is the relief pipe 10 equipped with the valve 11.

As thus far described, the apparatus does not differ from that commonly used.

At 12 is indicated a storage tank in which may be contained water or lime water or acid or other liquid and with which the relief pipe 10 is connected, said pipe being formed in a relatively deep trap or loop as indicated. In the tank 12 may be contained either lime water or else it may be used solely for the purpose of receiving the waste liquors which find their way through the relief pipe 10 when the relief valve 11 is opened to permit the injection of steam. Interposed between the tank 12 and the digester 1 there is the usual separator indicated at 13, the function of which is to separate the waste liquor and gases. The separator is at a sufficient elevation with respect to the tank 12 so that the liquor will flow therefrom to the tank, such flow being controlled or permitted at will by a valve 14 located in the pipe section 10$^a$ between the separator and the tank. It will be understood that the valve 14 may be of any convenient form of pressure-regulating valves. In the event that lime water is placed in the tank 12, it will, because of the introduction of the waste liquor contain more or less surfurous acid either free or combined with lime, but, as we have previously stated, in lieu of lime water, we may use water or any solution containing a suitable base corresponding to that employed in the process. In the event that organic radicals such as cymene are carried into the tank 12 by the waste liquor, they will, because of their lower specific gravity, collect on the top of the contents of the tank and subsequently may be removed in any desired manner. From this tank 12, the contents may be subsequently pumped directly into the digester when it is to be charged anew, and consequently in order to have the liquor at the proper temperature when it is introduced into the digester, it may be accomplished either by permitting the liquor to remain at substantially the temperature at which it was discharged from the separator previously, or else by heating it by any convenient means, such, for instance, as a steam coil 15 supplied by circulation pipes 16 connected with a suitable steam generator.

For the purpose of reclaiming the sulfur dioxid which escapes into the separator 13 from the digester, we connect with the top of the separator a pipe 17 which conducts the gas therefrom to suitable surface condensers or coolers which first separate out the water vapor, and organic radicals such as cymene, pinene, etc., and then condense or liquefy the sulfur dioxid. We employ two condensers,— one indicated at 19 and the other at 20. These may be of any suitable or convenient construction. As illustrated, each consists of a cylinder having diaphragms or partitions $a$ $a$ with connecting tubes $b$. The chamber above the upper partition $a$ is divided by a vertical partition $c$ so that the incoming gas will be conducted downward through one-half of the tubes into the compartment below the lower partition or diaphragm $a$, and thence upward into the second compartment in the upper part of the cylinder. Between the outlet compartment of the first condenser 19 and the inlet compartment of the second condenser 20 is a pipe or conduit 21 for the gas. The tubes are surrounded by any suitable refrigerating medium (cold water, a salt solution, or a gas expanded from a liquid), the inlet and the outlet pipes therefor being indicated at 22 23 for the condenser 19, and at 24 25 for the condenser 20. It will be understood that, in lieu of the particular form of condenser illustrated, any other surface condenser which is suitable for the purpose may be equally well employed.

The cooling medium, which preferably consists of water at the ordinary temperature, is introduced into the condenser 19, and is low enough in temperature to condense, as previously stated, the water vapor, cymene, pinene, etc., which may escape with the other gases from the digester but not sufficiently low to condense the sulfur dioxid gas. The liquid from the condensed gases in the condenser or cooler 19 is conducted by a pipe 26 to a suitable receptacle 27 from which they may be drawn to be refined, or it may be conducted by said pipe to the storage tank 12. The pipe 26 is shown as bent to form a deep trap and a gooseneck, and its discharge end feeds into the top of the receptacle. The pipe 26 may be provided with a suitable pressure-regulating valve 28. The gas, which escapes from the primary separating condenser 19 through the pipe 21 is conducted to the secondary condenser or cooler 20 and the refrigerating or cooling medium in this condenser is at a sufficiently low temperature to condense the sulfur dioxid or any other gases which it may be desirable to reclaim, the uncondensed gases such as carbon dioxid, escaping through a waste pipe 29 equipped with the pressure-regulating valve 30 to the atmosphere. In practice, the condensation or liquefaction of the sulfur dioxid may be accomplished in the secondary condenser by subjecting the gas to pressure by means of a compressor, in which event the water or other cooling medium need not be lower than 60° F. to 70° F. The liquid formed by condensed gases collecting in the bottom of the condenser 20 is conducted by a pipe or conduit 31 which is bent in the form of a U-trap of considerable depth to a storage tank 18. The pipe is provided with a suitable pressure-regulating valve 32.

The storage tank may be refrigerated by any suitable means to reduce or maintain the temperature of the liquefied sulfur dioxid to a point approximately 10° F. or below. It may also be necessary in some cases to refrigerate the liquefied sulfur dioxid before it enters the tank 18.

In order to utilize the condensed sulfur dioxid in the storage tank, we employ what we term a measuring tank which is indicated at 33, into which the liquid sulfur dioxid may be conducted by gravity through a conduit 34 equipped with a valve 35. From the bottom of this measuring tank, a pipe or conduit 36 leads to the bottom of the digester 1, said pipe or conduit being provided with a controlling valve 37 in proximity to the digester. While we have shown only one digester and a single conduit 36, it will be understood that the measuring tank may discharge into any number of digesters and that the digesters will be connected by conduits as at 17 with the condensing and cooling apparatus previously described. The sulfur dioxid may be injected into the digester by a pump to which the liquid dioxid is supplied from the tank, but in practice we prefer to inject the dioxid in the form of liquid and gas by the pressure of the dioxid gas in said tank. Any suitable means may be employed for heating the liquid sulfur dioxid in the measuring tank to raise it to a pressure sufficient to permit it to force the liquid and gaseous dioxid into the digester, and we have conventionally shown for this purpose steam heating coils 38 connected by circulating pipes with any convenient steam generator. By means of the coil 38, the liquid $SO_2$ is converted into a gas and the pressure in the chamber 33 is sufficient to force the liquid into the digester when desired. On the drawing, I have illustrated a by-pass around the chamber 38 including a pump 39 and a pipe 40. This by-pass is provided with valves 41, 42, so that it may be cut out when desired. The pipe 36 has a valve 43. By closing the valves 35 and 43, the liquid $SO_2$ may be pumped from the storage tank 18 directly into the digester. By closing the valves 41 and 42 and opening the valves 35 and 43, the liquid $SO_2$ may be caused to pass into the chamber 33 and then heated sufficiently so that the pressure in the chamber 33 will force the liquid $SO_2$ into the digester. The pressure-regulating devices or valves which are utilized in the reclamation system, may be set to keep the pressure in the condensers as high as possible without interfering with the relieving of the digesters, thereby permitting us to use a cooling medium at as high a temperature as possible, so that while the sulfur dioxid is ultimately condensed, nevertheless its temperature is not greatly less than that required for its condensation.

From the foregoing description, it will be seen that we have provided what may be regarded as a continuous process so far as the sulfur dioxid is concerned, in that the escaping sulfur dioxid gas is separated from the other gases, liquefied and again used.

It is not at all essential that the injection of the sulfur dioxid should be intermittent as we have described, because we have contemplated the continuous injection of the sulfur dioxid into the digesters during the cooking process. In many cases, a single injection of sufficient quantity into the closed digesters is all that will be required. In actual practice, we charge the digester with the raw material and the liquor after which the cover is secured in place. Then a sufficient quantity of sulfur dioxid is injected, after which the relief valve is opened to permit the escape of the air which collects above the charge. Then, after a period of about an hour, during which time the acid permeates the raw material, steam is slowly injected from time to time (with more injections of substantially pure sulfur dioxid if desired) until the cooking is completed. During the cooking, the pressure at the top of the digester is approximately 70 pounds per square inch.

To those persons who are skilled in this art, it will be obvious that our method possesses numerous advantages some of which may be adverted to as follows: In the first place, a much stronger solution of sulfur dioxid can be obtained by introducing it into a preferably closed digester during the cooking operation, or before it begins, than by the present known methods for the following reasons: It is impossible, as previously stated, to keep a strong solution of sulfur dioxid under atmospheric pressure because the solution becomes saturated before the desired cooking strength is obtained. On the other hand, if the temperature is reduced sufficiently to get a greater strength of solution, a large part of the gain is lost by the increase in temperature which takes place when the acid is introduced into the digester, since the digester is necessarily hot from the previous cooking; second, because the gain is further offset by the diluting effect of the larger amount of steam which is condensed in order to bring the liquor to the desired temperature for cooking; and, third, because the strength of the solution is weakened by the combination of the sulfurous acid with the lignin content of the raw material. Moreover, it is necessary to have the cooking acid at a relatively high temperature when the digester is first filled in order to cook quickly and well, and the impossibility of obtaining this, except in accordance with the present invention, is obvious for the reason that the retaining power of the solution can only be increased at a given desired temperature by increasing the pressure. In accordance with the present process, however, the milk of lime, or the water (in the event that water alone be used) can be introduced into the digester at as high a temperature as desired. When the sulfur dioxid is injected, it is possible to secure a stronger sulfur dioxid solution in the digester throughout the cooking than has previously been attainable.

Another point of advantage flowing from the present method is that the sulfur dioxid, which is introduced during the cooking, replaces that which escapes through the relief valve as the latter is opened from time to time to allow more steam to enter the digester for the purpose of maintaining the temperature and securing the necessary ebullition and circulation. There is, however, a further benefit, to which we may advert in this connection, to wit: that, by securing a solution in the digester of the greatest possible strength, the cooking may be carried on at a lower temperature at given pressures than heretofore, and this tends to prevent the decomposition of the cellulose, while at the same time the lignin and cementing materials which hold the fibers together are more effectively removed. In the method now in use on the contrary, because of the relatively weak acid, high temperatures are required and a considerable portion of the cellulose is decomposed or changed into organic compounds, and the cellulose which is not decomposed is, because of said higher temperature, weakened and made darker in color so as to cause the deterioration of the resulting fiber.

A most important advantage gained from the practice in the herein described method is that a larger amount of fiber can be produced from a given amount of raw material than has been possible with prior processes. Moreover a cleaner pulp will be produced, for the reason that a concentrated solution of acid exerts a higher osmotic pressure and penetrates such close-grained portions of the raw material as knots, bark, etc., which will have a higher lignin content and have more extraneous matter than is contained in the average of the raw materials. By reason of the penetration of the acid, when the temperature is sufficiently raised, it results in the cooking of the material into a more nearly white product which is mainly cellulose. As a further result, the screenings so-called, which are rejected in the regular process of refining the pulp, are greatly decreased.

Inasmuch as the result of the process is a pulp which contains lower lignin content, that pulp which is afterward bleached requires a smaller consumption of the bleaching agent, and can be bleached at lower temperatures, thereby effecting a saving in fuel. The bleached pulp is also stronger and whiter and there is less loss of fiber in the bleaching process. It hardly need be suggested that inasmuch as the process is carried on at lower temperatures than heretofore, material saving in the consumption of fuel is effected.

By the reclamation of the sulfur dioxid, as described, from the waste gases, we are able to effect a saving in the quantity thereof and thus to still further cheapen the cost of producing the pulp.

Where we refer in the claims to the injection of sulfur dioxid, we mean to include sulfur dioxid *per se.*, or sulfur dioxid absorbed or combined in any suitable liquor, in either of which cases the sulfur dioxid is substantially pure, *i. e.*, is unmixed with any substantial proportion of inert gases.

What we claim is:

1. In the manufacture of sulfite fiber, the following steps, to wit: charging the digester with the raw material and an aqueous liquor, closing the digester, injecting substantially pure sulfur dioxid to provide an excess of sulfurous acid; permitting the escape of air; permitting the charge to stand without heating while the acid permeates the raw material, and then injecting steam from time to time into the closed digester until the cooking is completed.

2. In the manufacture of sulfite fiber, the following steps, to wit: charging the digester with the raw material and an aqueous liquor, closing the digester, injecting substantially pure sulfur dioxid to provide an excess of sulfurous acid; permitting the charge to stand without heating while the acid permeates the raw material; then injecting steam into the closed digester until the cooking is completed, and injecting substantially pure sulfur dioxid into the closed digester to compensate for the weakening of the solution by the condensation of the steam.

3. In the manufacture of sulfite fiber, the herein described process which consists in cooking the raw material in a closed digester, discharging the relief liquors and gases from the digester, separating the relief gases from the relief liquor, separating and condensing sulfur dioxid from the other relief waste gases, and injecting the recovered sulfur dioxid into a closed digester.

4. In the manufacture of sulfite fiber, the following steps, to wit: separating sulfur dioxid gas by surface condensation from the other relief gases discharged from a digester during the cooking, and injecting said sulfur dioxid into a digester for digesting the raw material.

5. In the manufacture of sulfite fiber, discharging relief gases from the digester, separating sulfur dioxid from the other waste gases, and condensing said sulfur dioxid to liquid form.

6. In the manufacture of sulfite fiber, discharging relief gases from the digester, separating sulfur dioxid from the other waste gases, condensing said sulfur dioxid to liquid form, and injecting said condensed sulfur dioxid into a digester.

7. In the manufacture of sulfite fiber, the herein described process comprising the following steps, to wit: discharging relief gases from a charged digester, cooling said waste gases to condense and separate therefrom those gases having a higher volatilizing point than sulfur dioxid, separating sulfur dioxid from the remaining waste gases by surface condensation to liquid form, and employing said sulfur dioxid for the digestion of another charge of raw material.

8. In the manufacture of sulfite fiber, the herein described process of reclaiming sulfur dioxid gas from the waste relief gases discharged from the digester during the cooking operation, which consists of cooling the waste gases to condense and separate out of them those gases having a higher volatilizing point than sulfur dioxid, and separating sulfur dioxid from the remaining waste gases by surface condensation to liquid form.

9. In the manufacture of sulfite fiber, the herein described process of reclaiming sulfur dioxid gas from the waste gases discharged from the digester, which consists of discharging said gases from a digester, cooling the waste gases to condense and separate out of them those gases having a higher volatilizing point than sulfur dioxid, lowering the temperature of the remaining gases to a point at or below the volatilizing point of sulfur dioxid to liquefy said sulfur dioxid and separate it from the waste gases still remaining, and employing said sulfur dioxid in a digester for treating raw material.

10. The combination with a digester, of a separator connected to the relief pipe of the digester to separate the discharged gases and liquid, a primary and a secondary surface condenser connected in series to said separator, said primary condenser being adapted for condensing those gases having a higher volatilization than sulfur dioxid, and said secondary condenser adapted for condensing sulfur dioxid from the remaining waste gases, and means for receiving the products of condensation from said condensers.

11. The combination with a digester, and a relief pipe for the waste gases, of a primary and a secondary surface condenser connected in series to said relief pipe, said primary condenser being adapted for condensing those gases having a higher volatilization than sulfur dioxid, and said secondary condenser adapted for condensing sulfur dioxid from the remaining waste gases, and means for receiving the products of condensation from said condensers.

12. The combination with a digester, of an inlet pipe to said digester, means by which sulfur dioxid is forced through said inlet, means connected with the relief pipe of said digester for condensing sulfur dioxid out of the other relief gases from said digester, and means for supplying such sulfur dioxid to said first mentioned means.

13. The combination with a digester, of instrumentalities connected with said digester for separating and condensing the sulfur dioxid from the relief liquor and gases discharged from said digester, and means for forcing the reclaimed sulfur dioxid back into said digester.

In testimony whereof we have affixed our signatures, in presence of two witnesses.

HUGH K. MOORE.
ROBERT B. WOLF.

Witnesses:
 MARCUS B. MAY,
 PETER W. PEZZETTI.